UNITED STATES PATENT OFFICE.

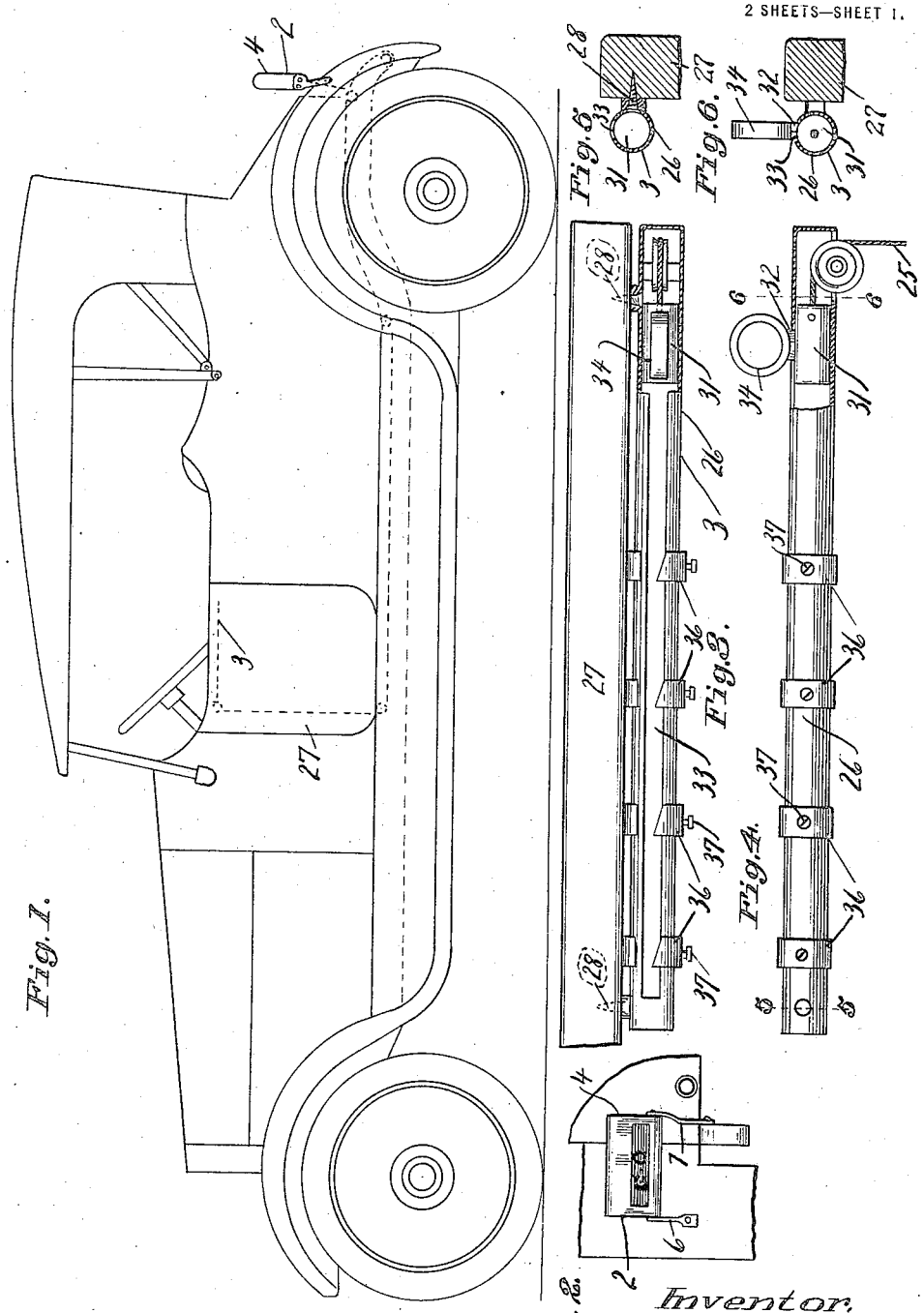

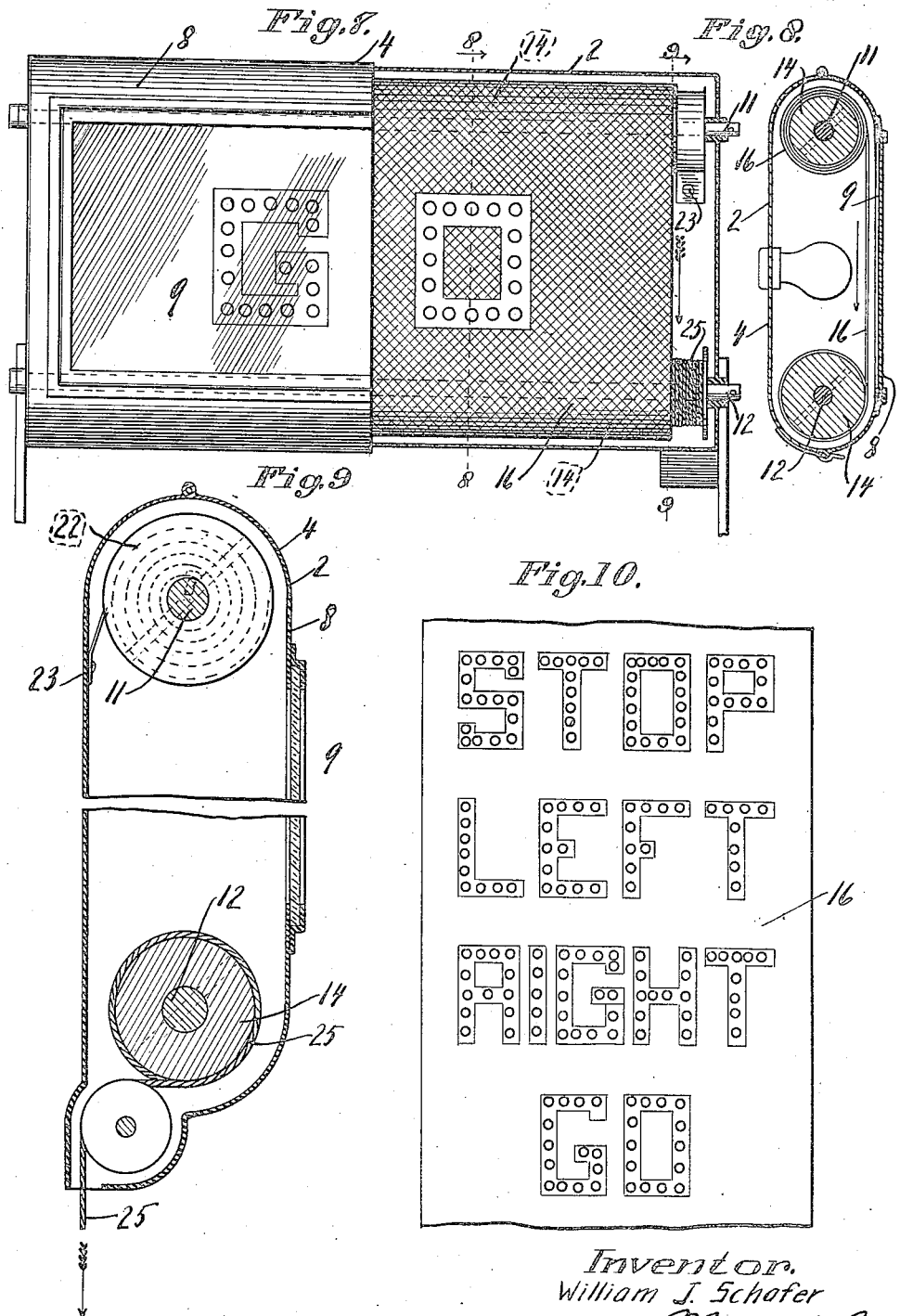

WILLIAM J. SCHAFER, OF SANTA CRUZ, CALIFORNIA.

DIRECTION INDICATOR.

1,421,727. Specification of Letters Patent. Patented July 4, 1922.

Application filed March 21, 1921. Serial No. 454,164.

*To all whom it may concern:*

Be it known that I, WILLIAM J. SCHAFER, a citizen of the United States, and resident of Santa Cruz, county of Santa Cruz, and State of California, have invented a new and useful Direction Indicator, of which the following is a specification.

The present invention relates to improvements in direction indicators and its object is to produce a device of the kind indicated that will enable the driver of an automobile to indicate to persons behind his machine whether he intends to stop, to turn to the left or to the right, or to go straight ahead. A further object of my invention is to use for this purpose a device that is simple of construction, positive in its action, is purely mechanical in its structure and operated directly by the hand of the driver.

I attain these objects by means of the mechanism illustrated in the accompanying drawing in which Figure (1) is a side view of an automobile having my device attached thereto, Figure (2) a rear view of my device on the automobile, only a small part of the latter being shown, Figure (3) a plan view of the control of my device, attached to one of the front doors of the automobile, Figure (4) a side view of said control, looking at it from the inside of the automobile, Figure (5) a cross-section through said controlling device along line 5—5 of Figure (4), Figure (6) another cross-section through the same device along line 6—6 of Figure (4), Figure (7) a rear view, partly in section, of my indicator, Figure (8) a cross-section through said indicator along line 8—8 of Figure (7), Figure (9) another cross-section through the same along line 9—9 of Figure (7), and Figure (10) a detail view of a direction indicating sheet used in my device.

Referring to the drawings more particularly it will be seen that my device consists principally of two parts, the indicator (2) and the control (3). The former is illustrated in particular in Figures (7) to (10) and is enclosed in a casing (4) of the shape of a flattened cylinder, as shown in Figure (8), which is fastened to the rear end of the automobile by means of two brackets (6) and (7), one of which is secured to either the body of the automobile or one of the rear springs while the other is secured to the rear part of the fender. The rear side (8) of the casing has an opening therein which is covered by the glass (9). In the casing are mounted, secured against longitudinal motion, two shafts (11) and (12), one in the upper part of the casing and the other in the lower part of the same. Each shaft carries a wooden roll (14) rigidly fastened thereto and between the two rolls extends the signal (16), one end of the latter being secured to each of said wooden rolls. The signal, which works on the upper roll very much on the same principle as does the ordinary spring-controlled window-shade, is of a width somewhat less than the width of the casing and of a length exceeding the distance between the two rolls sufficiently to allow it to be wound on one or both of said rolls a number of turns. The signal carries on different lines in letters defined by perforations the signs "Stop," "Left," "Right," and "Go," and it will be seen that in the operation of winding said signal from the upper roll on the lower roll or vise versa, the different signs are successively exposed to view through the glass. A light (21) is supported in the front of the casing opposite the glass so as to illuminate the sign at night time.

The upper shaft (11) carries, on one end, the spiral spring (22), one end of which is secured to the shaft while the other end is secured to the casing as shown at (23). The wooden roll on the lower shaft (12) carries, at the same end, a cable (25) secured thereto and leading over several pulleys secured in the proper places to the control on the front door. The cable and the spring are set in such a manner that a pull on the cable will cause the signal to be wound from the upper roll on the lower one against the resistance of the spring, while upon the release of the cable the spring will wind the signal in the opposite direction.

The control (3) is illustrated in Figures (3) to (6) and consists of a tubular channel (26) secured to the front door (27) by means of tacks (28) in which a cylindrical member (31) is adapted to slide back and forth. The latter is provided with an upright member (32) which extends through the opening (33) in the channel and is only of about one-half the width of said opening, so as to play freely therein. A ring (34) is provided on said upright member adapted to give a convenient hold to the finger of the driver. The tubular channel is provided with a plurality of clips (36), corresponding in number to the number of signs it is desired to display and distributed preferably evenly over the surface of the channel. These clips are intended as locking devices for the cylindrical member (31), to which the cable (25) is attached, and it will be seen that when the cylindrical member (31) is pushed into the channel, carrying with it the cable against the resistance of the spring (22) in the signalling device, it can pass the clips, but that a slight turn assisted by the tendency of the spring will firmly lock said member behind whatever clip it is desired to use. These clips being adjustable by means of the set screws (37) and being set to coincide with the different positions desired for the signal will enable the driver to quickly set the signal to expose any sign desired, to lock it there and to quickly return it to its original place, which may either expose the sign "Go" or no sign whatever.

I claim:

In means for actuating an indicating device of the character described, a tubular channel, a cylindrical member adapted to be reciprocated in said channel, an operative connection between said member and said indicating device and a plurality of clips adjustably fastened to said channel, each adapted to lock said cylindrical member.

WILLIAM J. SCHAFER.